United States Patent
Luehn et al.

(10) Patent No.: US 10,011,168 B2
(45) Date of Patent: Jul. 3, 2018

(54) OPERATING FLUID TANK

(71) Applicant: Kautex Textron GmbH & Co. KG, Bonn (DE)

(72) Inventors: Holger Luehn, St. Augustin (DE); Nicolai Schumacker, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 19 days.

(21) Appl. No.: 14/779,282

(22) PCT Filed: Mar. 17, 2014

(86) PCT No.: PCT/EP2014/055270
§ 371 (c)(1),
(2) Date: Sep. 22, 2015

(87) PCT Pub. No.: WO2014/147013
PCT Pub. Date: Sep. 25, 2014

(65) Prior Publication Data
US 2016/0046184 A1 Feb. 18, 2016

(30) Foreign Application Priority Data
Mar. 22, 2013 (DE) .................. 10 2013 004 926

(51) Int. Cl.
*B60K 15/03* (2006.01)
*B29C 45/16* (2006.01)
(Continued)

(52) U.S. Cl.
CPC .... *B60K 15/03177* (2013.01); *B29C 45/1676* (2013.01); *B60S 1/50* (2013.01);
(Continued)

(58) Field of Classification Search
CPC .... B60K 15/03177; B60K 2015/03032; B60K 2015/03046; B60K 2015/03493; B65D 79/005; B60Y 2410/123
(Continued)

(56) References Cited

U.S. PATENT DOCUMENTS 5,743,443 A    4/1998  Hins
6,547,019 B2 *  4/2003  Maeda ................ B29C 49/2408
                                         180/68.4
(Continued)

FOREIGN PATENT DOCUMENTS

DE    19912438 A1  9/1999
DE    19909041 A1  9/2000
(Continued)

OTHER PUBLICATIONS

English language PCT International Search Report and Written Opinion dated Jun. 12, 2014, received in corresponding PCT Application No. PCT/EP14/55270, 14 pgs.
(Continued)

*Primary Examiner* — Stephen Castellano
(74) *Attorney, Agent, or Firm* — Grossman, Tucker, Perreault & Pfleger, PLLC

(57) ABSTRACT

The invention relates to an operating fluid tank (1) for a motor vehicle, comprising a tank body which is composed of two mutually complementary, injection-molded shells (2) which are made of thermoplastic material and which are welded circumferentially to one another to form a substantially closed hollow body, wherein at least one shell (2a, 2b) is formed at least in certain regions from thermoplastic materials of differing strength and/or elasticity, wherein at least one partial region is formed from a thermoplastic (Continued)

Figure 1:
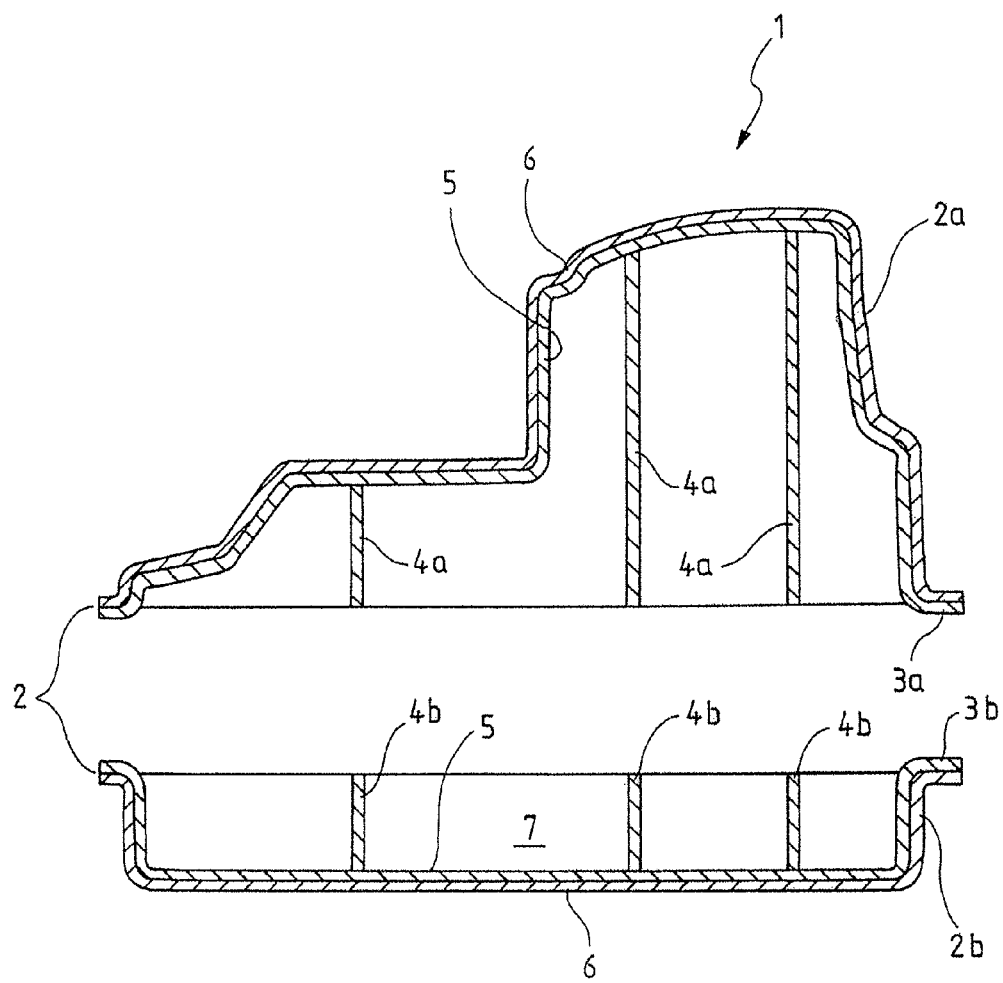

material which is elastically deformable, and wherein the shell (2a, 2b) has been obtained by a co-injection process during injection molding.

14 Claims, 2 Drawing Sheets

(51) Int. Cl.
*B60S 1/50* (2006.01)
*B60K 15/077* (2006.01)
*B29L 31/00* (2006.01)

(52) U.S. Cl.
CPC ..... *B29L 2031/7172* (2013.01); *B60K 15/077* (2013.01); *B60K 2015/03032* (2013.01); *B60K 2015/03046* (2013.01); *B60K 2015/03493* (2013.01); *B60K 2015/0777* (2013.01); *B60Y 2410/122* (2013.01); *B60Y 2410/123* (2013.01)

(58) Field of Classification Search
USPC .............................. 220/721, 723, 562, 563
See application file for complete search history.

(56) References Cited

U.S. PATENT DOCUMENTS

| | | | |
|---|---|---|---|
| 8,163,228 B2 | 4/2012 | Criel et al. | |
| 9,079,490 B2 | 7/2015 | Lemoine et al. | |
| 9,511,224 B1* | 12/2016 | Downs, Jr. | A61N 1/36032 |
| 2004/0173624 A1* | 9/2004 | Carter | F24D 3/1016 220/720 |
| 2010/0212806 A1 | 8/2010 | Lemoine et al. | |
| 2011/0139793 A1* | 6/2011 | Park | B60K 15/03177 220/563 |
| 2011/0192858 A1 | 8/2011 | Kisiler et al. | |
| 2013/0193139 A1 | 8/2013 | Karsch | |

FOREIGN PATENT DOCUMENTS

| | | |
|---|---|---|
| DE | 102007023024 A1 | 11/2008 |
| DE | 102011113845 A1 | 3/2013 |
| EP | 0571876 A1 | 12/1993 |
| EP | 0888867 A1 | 1/1999 |
| EP | 1571099 A2 | 9/2005 |
| EP | 1674232 A2 | 6/2006 |
| EP | 2116433 A1 | 11/2009 |
| FR | 2879517 A1 | 6/2006 |
| GB | 1065370 | 4/1967 |
| JP | 2004098886 A | 4/2004 |
| WO | 2006095024 A1 | 9/2006 |
| WO | 2008003386 A1 | 1/2008 |
| WO | 2008061588 A1 | 5/2008 |
| WO | 2012037662 A2 | 3/2012 |

OTHER PUBLICATIONS

English language PCT International Preliminary Report on Patentability dated Sep. 22, 2015, received in corresponding PCT Application No. PCT/EP14/55270, 12 pgs.

\* cited by examiner

OPERATING FLUID TANK

This application is the national stage (Rule 371) of PCT/EP2014/055270 filed Mar. 17, 2014.

The invention relates to an operating fluid tank for a motor vehicle, comprising a tank body which is composed of at least two mutually complementary, injection-molded shells which are made of thermoplastic material and which are welded circumferentially to one another to form a substantially closed hollow body.

An injection-molded tank of this type is known, for example, from DE 199 09 041 A1. An injection-molded tank which is composed of two tank halves, the tank halves in each case having been produced by an injection molding process, is known from EP 0 775 606 A2. Finally, a tank composed of injection-molded half-shells is known from U.S. Pat. No. 5,398,839 A. This document describes an injection-molded fuel tank which is assembled from two multilayered half-shells, said half-shells being composed in each case of an inner shell and an outer shell made of injection-molded plastic.

Operating fluid tanks within the context of the present invention are non-stationary tanks for motor vehicles, for example wiper-fluid tanks, oil tanks, coolant tanks for air-conditioning units, tanks for receiving liquid additives for catalytic exhaust-gas reduction or else fuel tanks for receiving diesel or gasoline fuels.

As tanks installed in a motor vehicle, all of the tanks mentioned above have to conform to particular safety requirements with respect to the stability of the tank and with respect to the tightness of the systems. Within certain limits, stability and tightness are interdependent.

Thus, by way of example, all of the tanks mentioned above have to be able to non-destructively absorb impact-related deformation forces. This applies in particular to fuel tanks, since, in the event of a crash, the unimpeded discharge of fuel to the surroundings must always be prevented. In addition, oil tanks and other secondary fluid tanks, for example also tanks for receiving coolant for air-conditioning units, should be able to withstand certain deformation forces upon impact, so that, in this case too, substances which may be harmful to the environment are prevented from being released. Moreover, tanks containing aqueous fluids should be able to withstand a certain ice pressure. This applies in particular to additive tanks and to tanks for receiving screen-wash fluid.

Measures for stiffening the structure of the tank body are known in principle in the case of known operating fluid tanks. By way of example, it is known to provide supports, tie rods or the like in the tank body. Similarly, it is known to produce tank shells from a composite material which has both an increased strength and also a relatively low weight. The structural reinforcements serve primarily for configuring the tank for an elevated internal pressure. The crash strength of tanks of this type may not be increased thereby, however, since an excessively high structural strength can lead to the concentration of destructive forces in certain regions of the tanks.

Therefore, the invention is based on the object of improving an operating fluid tank of the type mentioned in the introduction with respect to its deformation behavior using relatively simple means.

The object is achieved by the features of claim 1. Advantageous configurations of the invention become apparent from the dependent claims.

According to one aspect of the invention, provision is made of an operating fluid tank for a motor vehicle, comprising a tank body which is composed of at least two mutually complementary, injection-molded shells which are made of thermoplastic material and which are welded circumferentially to one another to form a substantially closed hollow body, wherein the tank body comprises at least one elastically deformable region made of an injected or molded-on thermoplastic elastomer.

According to a further aspect of the invention, provision is made of an operating fluid tank for motor vehicles, comprising a tank body which is composed of two mutually complementary, injection-molded shells which are made of thermoplastic material and which are welded circumferentially to one another to form a substantially closed hollow body, wherein at least one shell is formed at least in certain regions from thermoplastic materials of differing strengths and/or elasticity, wherein at least one partial region is formed from a thermoplastic material which is elastically deformable, and wherein the shell has been obtained by a co-injection process during injection molding or by sandwich injection molding.

The partial regions made of various thermoplastic materials can be delimited sharply with respect to one another, i.e. by geometrically clearly running boundary lines, but similarly it is also possible that the partial regions made of various thermoplastic materials merge into one another in an unsharp manner, i.e. penetrate one another.

By way of example, a thermoplastic elastomer can be provided as the elastically deformable plastic.

Elastically deformable regions of the operating fluid tank according to the invention can be formed by installation parts or add-on parts which are subjected, for example, to a surge of fluid within the operating fluid tank, or which are exposed when installed in the motor vehicle in such a way that they are subjected to deformation forces in the event of a possible accident or exert a lever action on the tank.

Therefore, it is expedient for example if at least one integrally attached functional installation part consists of an elastically deformable thermoplastic material. Functional installation parts of this type can be attached integrally within the tank, for example. These may be, for example, baffle components such as baffle walls, baffle rings or the like.

It is also the case, for example, that at least one shell of the tank can be provided with externally integrally attached add-on parts. By way of example, the tank body can have externally integrally attached retaining lugs, which are elastically deformable within certain limits, to be received in the body of the motor vehicle, and therefore in this way it is possible to achieve, for example, attenuated mounting of the tank body in the motor vehicle.

In a preferred variant of the operating fluid tank according to the invention, it is provided that at least one filler pipe or at least one filler neck made of an elastically deformable thermoplastic material is provided on at least one shell. In the event of an impact of the motor vehicle, filler pipes or filler necks are at particular risk to the effect that they can tear off from the tank body, since they form a lever arm with respect to the tank body.

If the filler neck or the filler pipe accordingly has a compliant form, in the event of an impact this makes it possible to prevent destruction of the tank body in the region at which the filler neck or the filler pipe is attached. Moreover, a flexible filler pipe also represents a simplification in the assembly of the fuel tank in the body of a motor vehicle. Finally, this also makes it possible to compensate for possible material tolerances during assembly.

In an expedient and advantageous variant of the operating fluid tank, it is provided that at least one shell of at least one tank wall is provided with at least one deformation region made of a first elastic thermoplastic material which is bordered by at least one second thermoplastic material of relatively higher strength.

In this way, deformation regions or deformation zones can be provided in the operating fluid tank according to the invention, these being elastically deformable, for example given a rising internal tank pressure, in such a manner that this pressure increase can be compensated for, without bringing about plastic deformation of the regions of the tank of higher strength.

This concept is fundamentally different from the approach of stiffening the tank wall, or supporting the tank walls against one another. The provision of partially elastic or elastic deformation regions of the tank reliably prevents deformation forces from acting on stiffer regions of the tank over a relatively long time; in the case of tank bodies made of polyethylene (HDPE), for example, these deformation forces have the effect that the plastic of the tank body flows.

In an advantageous embodiment of the operating fluid tank according to the invention, it is provided that the deformation region is formed as a deformation window in the tank wall. Alternatively, by way of example, the tank wall can also be formed in such a way that it has at least one circumferential deformation joint. A deformation joint of this type can extend, for example, transversely or at an angle of >0° to the direction of weight in the installed position of the operating fluid tank.

The provision of elastic or partially elastic deformation regions within the tank body moreover has the advantage that, by way of example, the tank can non-destructively withstand an ice pressure which possibly builds up inside the tank, if the tank body is filled with an aqueous medium and the ambient temperature drops below the freezing point of the aqueous medium.

In an expedient variant of the operating fluid tank according to the invention, at least one shell of the tank can have a multilayered wall structure.

A multilayered wall structure within the context of the present invention can also comprise a plurality of layers of similar thermoplastic materials in the sense of weldability. If a plurality of layers of identical or similar thermoplastic materials are used, these layers can be joined or welded to one another in certain regions. This relates in particular to peripheral edges or borders of a shell, and therefore it is thereby also possible to ensure, for example, that intermediate layers are not exposed in these regions.

By way of example, at least one shell can have at least one outer layer made of a first thermoplastic material and at least one inner layer made of a second thermoplastic material, wherein the first and the second thermoplastic materials have different physical properties and/or are structurally different.

Physical properties in this context are the impact resistance and elasticity of the thermoplastic material. Structurally different thermoplastic materials are, for example, those with or without fillers or those with different molecular structures.

By way of example, one layer can consist of a polyolefin or of mixtures of various polyolefins and a further layer can consist of a polyamide or mixtures of various polyamides.

By way of example, an outer layer of a shell can consist of a single-layered or multilayered extrudate based on HDPE, whereas an inner layer can consist at least of a shell made of a polyamide, a POM, an ABS or another thermoplastic material. Structure-reinforcing layers, insulation layers or else barrier layers can be provided between these layers.

In a particularly favorable and expedient variant of the operating fluid tank according to the invention, it is provided that the outer layer comprises a thermoplastic elastomer at least in certain regions.

As an alternative or in addition, the inner layer can be formed accordingly.

In a further expedient configuration of the operating fluid tank according to the invention, it can be provided that at least one valve body for a filling venting valve or an operational venting valve is provided as the functional installation part.

In an advantageous variant of the operating fluid tank, it is possible, for example, to provide this with at least one integrally molded-on filler pipe formed entirely or partially from a thermoplastic elastomer. By way of example, the filler pipe can be formed, at its outlet-side end, with an integrally attached reverse surge valve in the form of a check valve or in the form of a spout which can be compressed by the fluid pressure.

Figure 2:
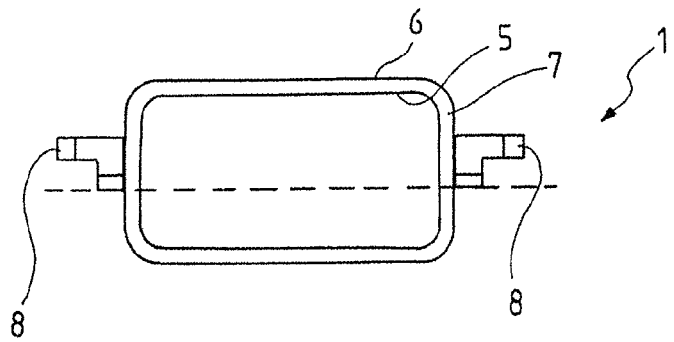
Figure 3:
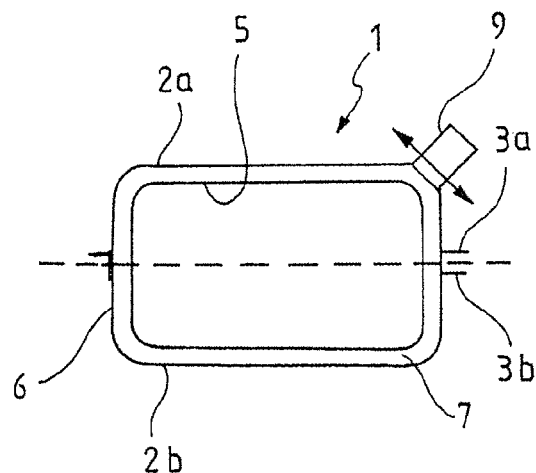
Figure 4:
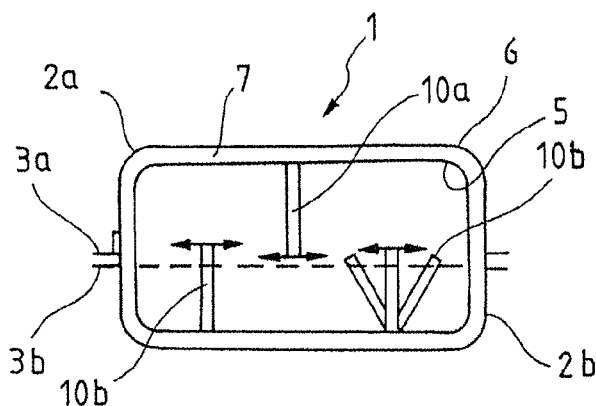
Figure 5:
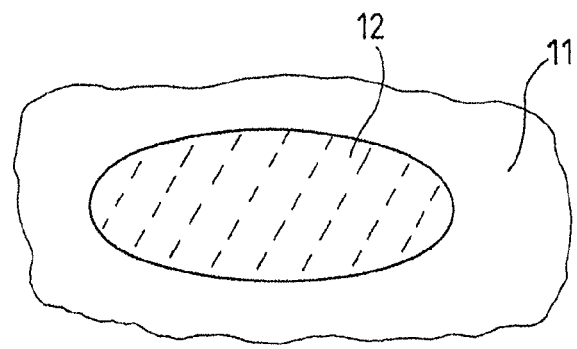

The invention will be explained hereinbelow on the basis of an exemplary embodiment shown in the drawings, in which:

FIG. 1: shows a sectioned exploded view of an operating fluid tank according to the invention, FIG. 2: shows an illustration of an operating fluid tank according to the invention with a three-layered wall structure and externally attached fastening means, FIG. 3: shows a further variant of the operating fluid tank according to the invention with a flexible filler pipe, FIG. 4: shows a variant of the operating fluid tank according to the invention with internally integrally attached, flexible baffle elements, and FIG. 5: shows a view of a tank wall of the operating fluid tank according to the invention with a deformation window provided in the tank wall.

The operating fluid tank 1 according to the invention is composed essentially of at least two injection-molded shells 2a, 2b, the shell 2a forming an upper shell and the shell 2b forming a lower shell of the operating fluid tank 1. The shells in each case form a peripherally circumferential flange 3a, 3b, at which the shells 2 are welded to one another to form the closed operating fluid tank. Each of the shells 2 has been obtained by co-injection molding, both the upper shell and the lower shell 2a, 2b in each case having integrally attached structures, for example in the form of partition wall elements 4a, 4b. The partition wall elements 4a, 4b can divide the operating fluid tank 1 into various compartments, which more or less communicate with one another. These partition wall elements 4a, 4b likewise perform the function of baffle wall elements.

In the exemplary embodiment of the invention as shown in FIG. 1, the shells 2 each have a two-layered form, comprising an inner layer 5 and also an outer layer 6.

At this point, it should be emphasized that the shells 2 of the operating fluid tank 1 according to the invention can in principle also have a single-layered form, without departing from the basic principle that at least one of the shells is composed of two different plastics either with different physical properties or with different structural/molecular properties.

In principle, however, it also lies within the context of the invention to form one or both of the shells of the operating fluid tank 1 in each case with multiple layers, in which case at least one of the shells has a plurality of planar regions made of different thermoplastic materials.

In this respect, it is possible to inject a second thermoplastic material into at least one aperture in at least one shell made of a first thermoplastic material. As an alternative or in addition, it is possible to thicken at least one wall region of at least one shell with a second thermoplastic material of differing elasticity or of differing molecular structure by injection molding.

With reference to FIG. 1, it can be provided that the inner layer 5 and the outer layer 6 consist of thermoplastic materials of differing molecular structure, but these layers can also be formed from identical thermoplastic materials with different fillers or in each case filled and unfilled.

Finally, the layers can be formed in such a way that, by way of example, the inner layer 5 is filled in certain regions and the outer layer 6 is not filled.

The operating fluid tank 1 shown in FIG. 1 is formed, for example, as a tank for an aqueous urea solution for selective catalytic exhaust-gas denitrogenization on a diesel motor vehicle.

The outer layer 6 of the upper shell 2a is formed from a polyolefin, whereas the inner layer 5 of the upper shell 2b is formed from a polyamide.

The lower shell 2b, by contrast, comprises an inner layer 5 made of a polyamide and an outer layer 6 made of a thermoplastic elastomer, which forms a stone chip guard for the lower shell 2b.

The operating fluid tank 1 as per the variant shown in FIG. 2 comprises two shells 2 each having a three-layered form, where an inner layer 5 consists of a thermoplastic material with a thermally conductive filler, an intermediate layer 7 consists of a foamed thermoplastic material and an outer layer 6 consists of a thermoplastic material which is elastic at least in certain regions. Fastening lugs 8 are integrally molded onto the outer layer 6 of the upper shell 2a, it being possible for these fastening lugs to have, for example, a higher elasticity or a higher strength than the rest of the material of the outer layer 6.

In the variant of the operating fluid tank 1 shown in FIG. 3, this comprises an outer layer 6 with an integrally attached filler pipe 9 consisting of a thermoplastic elastomer.

In the exemplary embodiment shown in FIG. 4, the upper shell 2a and the lower shell 2b likewise each have a multilayered form, these having an inner layer made of a thermoplastic elastomer and an outer layer 6 made of a thermoplastic material of higher strength, for example based on HDPE.

Baffle wall elements 10a, 10b are integrally attached to the inner layer 5. These baffle wall elements 10a, 10b likewise consist of a thermoplastic elastomer, and therefore they can optimally yield in a defined manner in the event of severe surge movements of the fluid stored in the operating fluid tank 1, and thus consume some of the energy of the fluid surge.

FIG. 5, finally, illustrates a further variant of the operating fluid tank 1 according to the invention. FIG. 5 shows only a section of a tank wall 11 of the operating fluid tank 1. This tank wall 11 can have a single-layered and also multilayered form.

In the tank wall 11, provision is made of at least one deformation window made of an elastically deformable thermoplastic material with a relatively low strength which is surrounded by a relatively stiffer thermoplastic material of the tank wall 11. The thermoplastic material which fills the deformation window 12 can be, for example, a thermoplastic elastomer which has been injected into the tank wall 11 by co-injection.

LIST OF REFERENCE SIGNS

1 Operating fluid tank
2a Upper shell
2b Lower shell
3a, 3b Flange
4a, 4b Partition wall elements
5 Inner layer
6 Outer layer
7 Intermediate layer
8 Fastening lugs
9 Filler pipe
10a, 10b Baffle wall elements
11 Tank wall
12 Deformation window

What is claimed is:

1. An operating fluid tank for a motor vehicle, comprising:
a tank body having at least two mutually complementary shells of thermoplastic material,
wherein the shells are welded circumferentially to one another to form a substantially closed hollow body,
wherein at least one shell of the shells is a multilayered shell and comprises at least a first layer having at least one region formed of a first thermoplastic material and another region formed of a second thermoplastic material, wherein the first layer is an outer layer of the at least one multilayered shell,
wherein the second thermoplastic material has a greater strength than the first thermoplastic material,
wherein the first thermoplastic material is elastically deformable,
wherein the at least one region formed of the first thermoplastic material provides a deformation region which is bordered by the region formed of the second thermoplastic material,
wherein the deformation region elastically deforms in response to a pressure rise within the fluid tank to prevent plastic deformation of the region formed of the second thermoplastic material.

2. The operating fluid tank as claimed in claim 1, wherein the elastically deformable first thermoplastic material is formed of a thermoplastic elastomer.

3. The operating fluid tank as claimed in claim 1, further comprising at least one integrally attached functional installation part and/or at least one add-on part made of thermoplastic material.

4. The operating fluid tank as claimed in claim 3, further comprising a plurality of integrally attached retaining lugs made of thermoplastic material.

5. The operating fluid tank as claimed in claim 3, wherein the functional installation part comprises at least one elastically deformable baffle.

6. The operating fluid tank as claimed in claim 3, wherein at least one valve body for a filling venting valve or an operational venting valve is provided as the functional installation part.

7. The operating fluid tank as claimed in claim 1, wherein at least one shell has at least one filler pipe or at least one filler neck made of thermoplastic material.

8. The operating fluid tank as claimed in claim 1, wherein the deformation region is surrounded by the region formed of the second thermoplastic material.

9. The operating fluid tank as claimed in claim 1, wherein the second thermoplastic material has a greater stiffness than the first thermoplastic material.

10. The operating fluid tank as claimed in claim 1, wherein the at least two mutually complementary shells are injection-molded shells.

11. The operating fluid tank as claimed in claim 1, wherein at least one shell is a co-injection injection-molded shell or a sandwich injection-molded shell.

12. The operating fluid tank as claimed in claim 1, wherein the region formed of the second thermoplastic material encompasses the deformation region.

13. The operating fluid tank as claimed in claim 1, wherein the deformation region is formed as a deformation window which is surrounded by the region formed of the second thermoplastic material.

14. The operating fluid tank as claimed in claim 1, wherein the at least one shell of the shells which comprises at least the first layer having at least one region formed of the first thermoplastic material and another region formed of the second thermoplastic material is a single layer shell.

\* \* \* \* \*